United States Patent [19]
Tilcox

[11] Patent Number: 5,871,306
[45] Date of Patent: Feb. 16, 1999

[54] PIPE SUPPORTING APPARATUS

[76] Inventor: Michael S. Tilcox, 11 Guelph Rd., #304, Erin, Ontario, Canada, N0B 1T0

[21] Appl. No.: 838,640

[22] Filed: Apr. 9, 1997

[51] Int. Cl.[6] .................................................. F16L 1/00
[52] U.S. Cl. .......................... 405/157; 405/154; 248/49; 248/903
[58] Field of Search .................................. 405/157, 159, 405/172, 154; 248/49, 903, 65

[56] References Cited

U.S. PATENT DOCUMENTS

| | | | |
|---|---|---|---|
| 3,767,149 | 10/1973 | Hill | 405/157 |
| 3,895,496 | 7/1975 | Perrott et al. | 405/157 |
| 4,126,012 | 11/1978 | Waller | 405/157 |
| 4,979,462 | 12/1990 | Kramer | 405/157 |
| 5,007,768 | 4/1991 | Waller | 405/172 |
| 5,553,975 | 9/1996 | Elkins | 405/172 |

*Primary Examiner*—Tamara L. Graysay
*Assistant Examiner*—Frederick L. Lagman

[57] ABSTRACT

A pipe supporting apparatus including a pipe supporting portion securable within a trench beneath a length of pipe for support thereof before filling the trench around the length of pipe with backfill material.

4 Claims, 2 Drawing Sheets

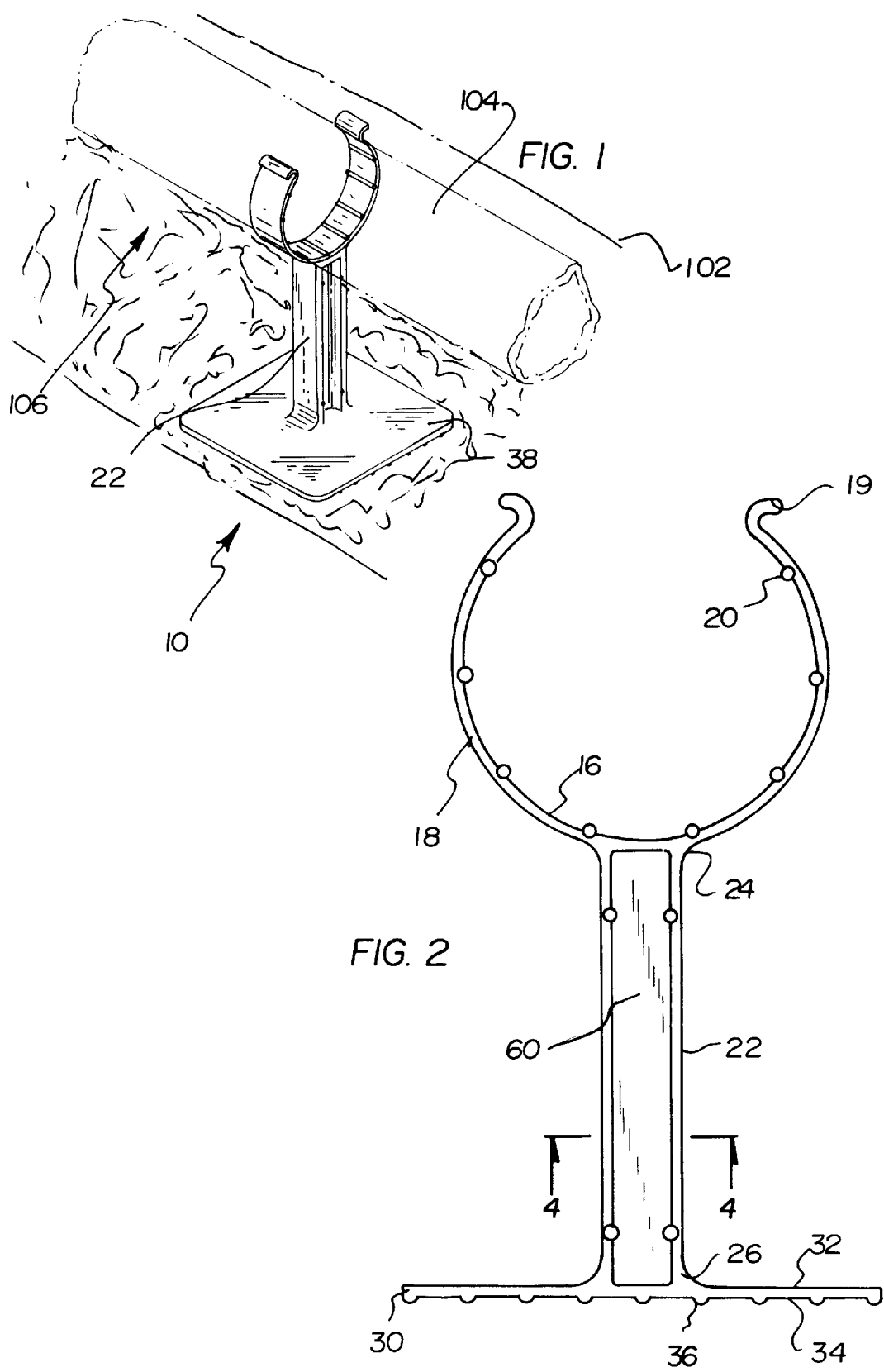

PIPE SUPPORTING APPARATUS

BACKGROUND OF THE INVENTION

1. Field of the Invention

The present invention relates to a pipe supporting apparatus and more particularly pertains to holding a pipe at a recommended height while filling a trench with backfill material with a pipe supporting apparatus.

2. Description of the Prior Art

The use of pipe supports is known in the prior art. More specifically, pipe supports heretofore devised and utilized for the purpose of supporting pipes are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,139,142 to Maple et al. discloses an aboveground anchor support assembly for a pipeline.

U.S. Pat. No. 3,963,205 to Hageman discloses pipe support systems.

U.S. Pat. No. Des. 330,504 to Collins discloses the ornamental design for a pipe support strap for use during a concrete pour.

U.S. Pat. No. 4,951,902 to Hardtke discloses a support bracket for pipes.

U.S. Pat. No. 4,477,200 to Persichillo discloses multiple purpose pipe connecting brackets.

U.S. Pat. No. 4,655,072 to Miyoshi discloses a clamp.

While these devices fulfill their respective, particular objective and requirements, the aforementioned patents do not describe a pipe supporting apparatus for holding a pipe at a recommended height while filling a trench with backfill material.

In this respect, the pipe supporting apparatus according to the present invention substantially departs from the conventional concepts and designs of the prior art, and in doing so provides an apparatus primarily developed for the purpose of holding a pipe at a recommended height while filling a trench with backfill material.

Therefore, it can be appreciated that there exists a continuing need for new and improved pipe supporting apparatus which can be used for holding a pipe at a recommended height while filling a trench with backfill material. In this regard, the present invention substantially fulfills this need.

SUMMARY OF THE INVENTION

In the view of the foregoing disadvantages inherent in the known types of pipe supports now present in the prior art, the present invention provides an improved pipe supporting apparatus. As such, the general purpose of the present invention, which will be described subsequently in greater detail, is to provide a new and improved pipe supporting apparatus and method which has all the advantages of the prior art and none of the disadvantages.

To attain this, the present invention essentially comprises a trench dug into a ground area to form a recipient surface. A length of pipe is positionable within the trench. A pipe supporting portion is included having an upper portion comprised of an arcuate member having an upper surface and a lower surface. The upper surface is dimensioned to receive the length of pipe thereon. The pipe supporting portion includes an intermediate portion comprised of an elongated member having an upper end and a lower end. The upper end is secured to the lower surface of the arcuate member at an intermediate portion thereof. The pipe supporting portion further including a lower portion comprised of a planar member having a generally square configuration. The planar member has an upper surface and a lower surface. The upper surface is secured to the lower end of the elongated member. The lower surface of the lower portion has a plurality of runners disposed thereon whereby the pipe supporting portion can be secured within the trench beneath the length of pipe.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pipe supporting apparatus which has all the advantages of the prior art pipe supports and none of the disadvantages.

It is another object of the present invention to provide a new and improved pipe supporting apparatus which may be easily and efficiently manufactured and marketed.

It is a further object of the present invention to provide a new and improved pipe supporting apparatus which is of durable and reliable construction.

An even further object of the present invention is to provide a new and improved pipe supporting apparatus which is susceptible of a low cost of manufacture with regard to both materials and labor, and which accordingly is then susceptible of low prices of sale to the consuming public, thereby making such a pipe supporting apparatus economically available to the buying public.

Still yet another object of the present invention is to provide a new and improved pipe supporting apparatus which provides in the apparatuses and methods of the prior art some of the advantages thereof, while simultaneously overcoming some of the disadvantages normally associated therewith.

Even still another object of the present invention is to provide a new and improved pipe supporting apparatus for holding a pipe at a recommended height while filling a trench with backfill material.

Lastly, it is an object of the present invention to provide a new and improved pipe supporting apparatus including a pipe supporting portion securable within a trench beneath a length of pipe for support thereof before filling the trench around the length of pipe with backfill material.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the pipe supporting apparatus constructed in accordance with the principles of the present invention.

FIG. 2 is a front elevation view of the present invention.

The same reference numerals refer to the same parts through the various Figures.

DESCRIPTION OF THE PREFERRED EMBODIMENT

Figure 3:
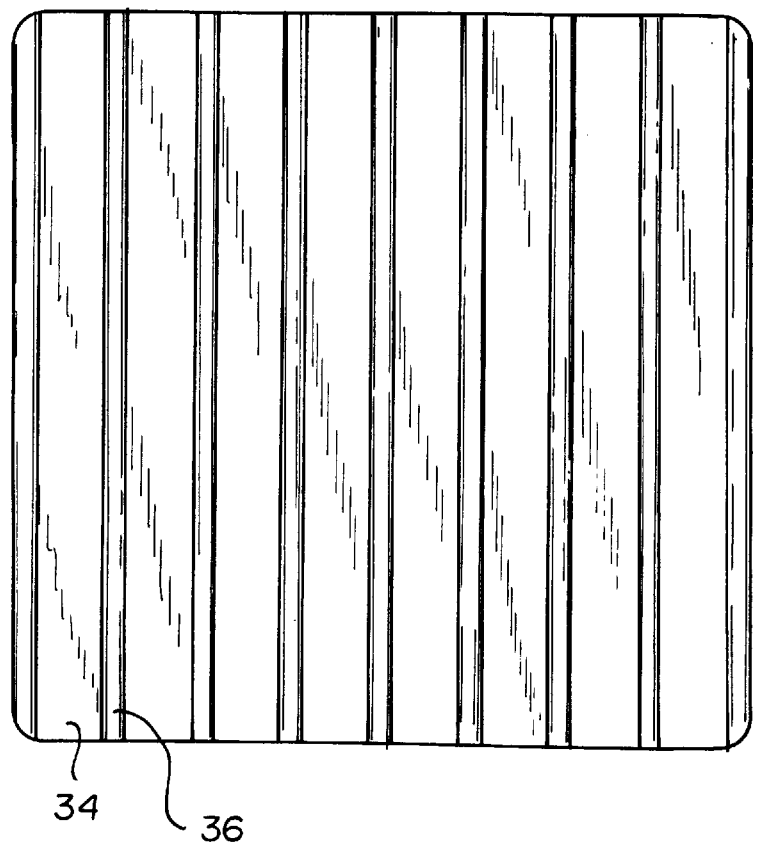
FIG. 3 is a side elevation view of a second embodiment of the present invention.
Figure 4:
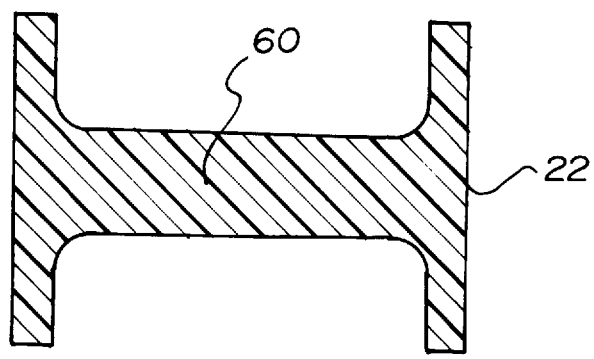
FIG. 4 is an enlarged fragmentary view of the markings of the second embodiment of the present invention.

With reference now to the drawings, and in particular, to FIG. 1 thereof, the preferred embodiment of the new and improved pipe supporting apparatus embodying the principles and concepts of the present invention and generally designated by the reference number 10 will be described.

Specifically, it will be noted in the various Figures that the device relates to a new and improved pipe supporting apparatus for holding a pipe at a recommended height while filling a trench with backfill material. In its broadest context, the device consists of a trench, a length of pipe, a pipe supporting portion comprised of an upper portion, an intermediate portion, and a lower portion. Such components are individually configured and correlated with respect to each other so as to attain the desired objective.

The device 10 requires a trench 100 dug into a ground area 102 to form a recipient surface. The trench 100 is dug to the specifications of the septic system or type piping system to be placed therein.

A length of pipe 104 is positionable within the trench 100. The trench 100 should be large enough to have the length of pipe 104 positioned therein and filled in with backfill material 106.

A pipe supporting portion 12 is included having an upper portion comprised of an arcuate member 14 having an upper surface 16 and a lower surface 18. Free ends 19 of the upper portion turn outwardly. The upper surface 16 has a plurality of ribs 20 disposed equidistantly thereon. The upper surface 16 is dimensioned to receive the length of pipe 104 thereon. The width of the arcuate member 14 needs to be great enough the allow the length of pipe 104 to be positioned thereon.

The pipe supporting portion 12 includes an intermediate portion comprised of an elongated member 22 having an upper end 24 and a lower end 26. The upper end 24 is secured to the lower surface 18 of the arcuate member 14 at an intermediate portion thereof.

The pipe supporting portion 12 further including a lower portion comprised of a planar member 30 having a generally square configuration. The planar member 30 has an upper surface 32 and a lower surface 34. The upper surface 32 is secured to the lower end 26 of the elongated member 22. The lower surface 34 of the lower portion has a plurality of runners 36 disposed thereon whereby the pipe supporting portion 12 can be secured within the trench 100 beneath the length of pipe 102. A plurality of pipe supporting portions 12 would be used along the entire length of pipe 12. An individual pipe supporting portion 12 will be placed at appropriate intervals along the length of pipe 102 elevating it above the trench 100 at a recommended height for the backfill material 106 to go under it. The construction of the pipe supporting portion 12 would be of a polyethylene plastic.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A pipe supporting apparatus for holding a pipe at a recommended height while filling a trench with backfill material comprising, in combination:

a trench dug into a ground area to form a recipient surface;

a length of pipe positionable within the trench;

a pipe supporting portion comprised of:

an upper portion comprised of an arcuate member having an upper surface and a lower surface, free ends of the upper portion turning outwardly, the upper surface having a plurality of ribs disposed equidistantly thereon, the upper surface being dimensioned to receive the length of pipe thereon;

an intermediate portion comprised of an elongated member having an upper end and a lower end, the upper end secured to the lower surface of the arcuate member at an intermediate portion thereof;

a lower portion comprised of a planar member having a generally square configuration, the planar member having an upper surface and a lower surface, the upper surface secured to the lower end of the elongated member, the lower surface of the lower portion having a plurality of runners disposed thereon whereby the pipe supporting portion can be secured within the trench beneath the length of pipe.

2. A pipe supporting apparatus comprising:

a pipe supporting portion securable within a trench beneath a length of pipe for support thereof before filling the trench around the length of pipe with backfill material;

the pipe supporting portion further including an upper portion comprised of an arcuate member having an upper surface and a lower surface, free ends of the upper portion turning outwardly, the upper surface having a plurality of ribs disposed equidistantly thereon, the upper surface being dimensioned to receive the length of pipe thereon.

3. The pipe supporting apparatus as set forth in claim 2 wherein the pipe supporting portion further comprising an intermediate portion comprised of an elongated member having an upper end and a lower end, the upper end secured to the lower surface of the arcuate member at an intermediate portion thereof.

4. The pipe supporting apparatus as set forth in claim 3 wherein the pipe supporting portion further comprising a lower portion comprised of a planar member having a generally square configuration, the planar member having an upper surface and a lower surface, the upper surface secured to the lower end of the elongated member, the lower surface of the lower portion having a plurality of runners disposed thereon whereby the pipe supporting portion can be secured within the trench beneath the length of pipe.

* * * * *